(12) United States Patent
Vasseur et al.

(10) Patent No.: US 11,156,354 B2
(45) Date of Patent: Oct. 26, 2021

(54) METHOD FOR EVALUATING FOULING OF A HEAT EXCHANGER

(71) Applicant: Electricite de France, Paris (FR)

(72) Inventors: Julien Vasseur, Amiens (FR); Aurélien Schwartz, Thise (FR); David Pineau, Vertou (FR)

(73) Assignee: Electricite de France

( * ) Notice: Subject to any disclaimer, the term of this patent is extended or adjusted under 35 U.S.C. 154(b) by 0 days.

(21) Appl. No.: 16/772,279

(22) PCT Filed: Dec. 13, 2018

(86) PCT No.: PCT/FR2018/053247
§ 371 (c)(1),
(2) Date: Jun. 12, 2020

(87) PCT Pub. No.: WO2019/115948
PCT Pub. Date: Jun. 20, 2019

(65) Prior Publication Data
US 2021/0003278 A1    Jan. 7, 2021

(30) Foreign Application Priority Data
Dec. 13, 2017    (FR) ...................................... 1762085

(51) Int. Cl.
*F22B 37/00*    (2006.01)
*F22B 37/48*    (2006.01)
(Continued)

(52) U.S. Cl.
CPC ............ *F22B 37/003* (2013.01); *F22B 37/48* (2013.01); *F28G 15/003* (2013.01); *G01N 17/008* (2013.01); *G06F 17/16* (2013.01)

(58) Field of Classification Search
CPC ..... G01N 17/008; G06F 17/16; F22B 37/003; F22B 37/48; F28G 15/003
See application file for complete search history.

(56) References Cited

U.S. PATENT DOCUMENTS 7,266,943 B2 *   9/2007   Kammel ................. F01N 3/035
                                                             60/297
9,852,963 B2 *  12/2017   Shedd ..................... F28D 15/00
(Continued)

FOREIGN PATENT DOCUMENTS

| EP | 3087444 A2 | 11/2016 |
| FR | 2993090 A1 | 1/2014 |
| FR | 3044157 A1 | 5/2017 |

OTHER PUBLICATIONS

International Search Report for PCT/FR2018/053247 dated May 8, 2019; 2 pages.
(Continued)

*Primary Examiner* — Elias Desta
(74) *Attorney, Agent, or Firm* — Lerner, David, Littenberg, Krumholz & Mentlik, LLP (57) ABSTRACT

The invention relates to a method for evaluation of fouling of passages of a spacer plate (10) of a tubular heat exchanger (11), wherein first, second and third pressure sensors (31, 32, 33) are arranged, the method comprising steps of:
  (a) during a transient operation phase of the heat exchanger determination of a value over time of Wide Range Level NGL, from the measurements of the first and third pressure sensors (31, 33), and of a value over time of Narrow Range Level NGE, from the measurements of the second and third pressure sensors (31, 33);
  (b) determination of a value over time of Steam Range Level deviation $\Delta NGV$, corresponding to the NGL from which a component representative of a variation of free water surface in the heat exchanger has been filtered, from the values of NGL and NGE;
  (c) comparison of the determined value of $\Delta NGV$ with a set of reference profiles $\Delta NGV_i$ for said transient operation phase of the heat exchanger, each reference profile $\Delta NGV_i$ being associated with a level of fouling so as to
(Continued)

- (a0) Generation of reference profiles $\Delta NGV_i$
- (a) Determination of NGL and NGE
- (b) Determination of $\Delta NGV$
- (c) Comparison of $\Delta NGV$ and $\Delta NGV_i$
- (d) Evaluation of fouling identify a target reference profile $\Delta NGV_{opt}$ among the reference profiles $\Delta NGV_i$ for said transient operation phase of the heat exchanger, which is that closest to the determined value $\Delta NGV$.

(d) restored on an interface (3) of the level of fouling associated with the identified target reference profile $\Delta NGV_{opt}$.

13 Claims, 11 Drawing Sheets

(51) Int. Cl.
*F28G 15/00* (2006.01)
*G01N 17/00* (2006.01)
*G06F 17/16* (2006.01)

(56) References Cited

U.S. PATENT DOCUMENTS

| 10,533,881 B2* | 1/2020 | Vanberg | F24F 11/30 |
| 2005/0056313 A1* | 3/2005 | Hagen | B01F 5/0453 |
| | | | 137/3 |
| 2017/0003215 A1 | 1/2017 | Renard et al. | |

OTHER PUBLICATIONS

French Preliminary Search Report for Application No. 1762085 dated Jul. 26, 2018, 2 pages.

\* cited by examiner

METHOD FOR EVALUATING FOULING OF A HEAT EXCHANGER

CROSS-REFERENCE TO RELATED APPLICATIONS

The present application is a national phase entry under 35 U.S.C § 371 of International Application No. PCT/FR2018/053247 filed Dec. 13, 2018, which claims priority from French Application No. 1762085 filed Dec. 13, 2017, all of which are hereby incorporated herein by reference.

BACKGROUND OF THE INVENTION

The present invention relates in general to the field of inspection of tubes of a tubular heat exchanger. More precisely, the invention relates to a method for evaluation of the fouling of passages of a spacer plate of a tubular heat exchanger, said passages being arranged along the tubes and aiding circulation of fluid in said heat exchanger through said plate.

A steam generator is generally composed of a bundle of tubes in which hot fluid circulates, and around which the fluid to be heated circulates. For example, in the case of a steam generator of a nuclear plant of PWR type, steam generators are heat exchangers which utilise the energy of the primary circuit coming from the nuclear reaction to transform water from the secondary circuit into steam which will feed the turbine and consequently produce electricity.

The steam generator brings the secondary fluid from a liquid water state to the steam state right at saturation point, by using the heat of the primary water. The latter circulates in tubes around which the secondary water circulates. The outlet of the steam generator is the highest point of the secondary circuit in temperature and pressure.

The exchange surface, physically separating the two circuits, is accordingly constituted by a tubular bundle composed of 3500 to 5600 tubes, according to the model, in which the primary water brought to high temperature (320° C.) and high pressure (155 bars) circulates.

Figure 1A:
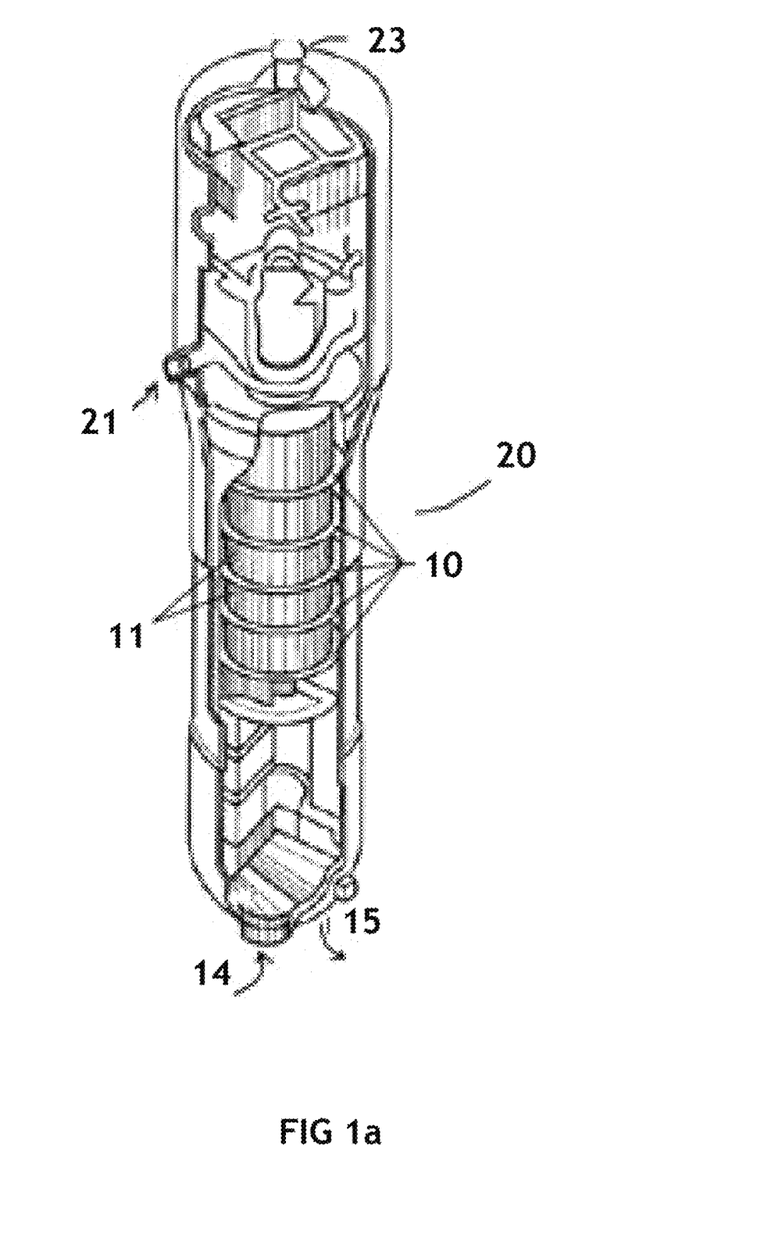
FIGS. 1a-1b, already commented on, according to two views schematically illustrate a heat exchanger of steam generator type.
Figure 1B:
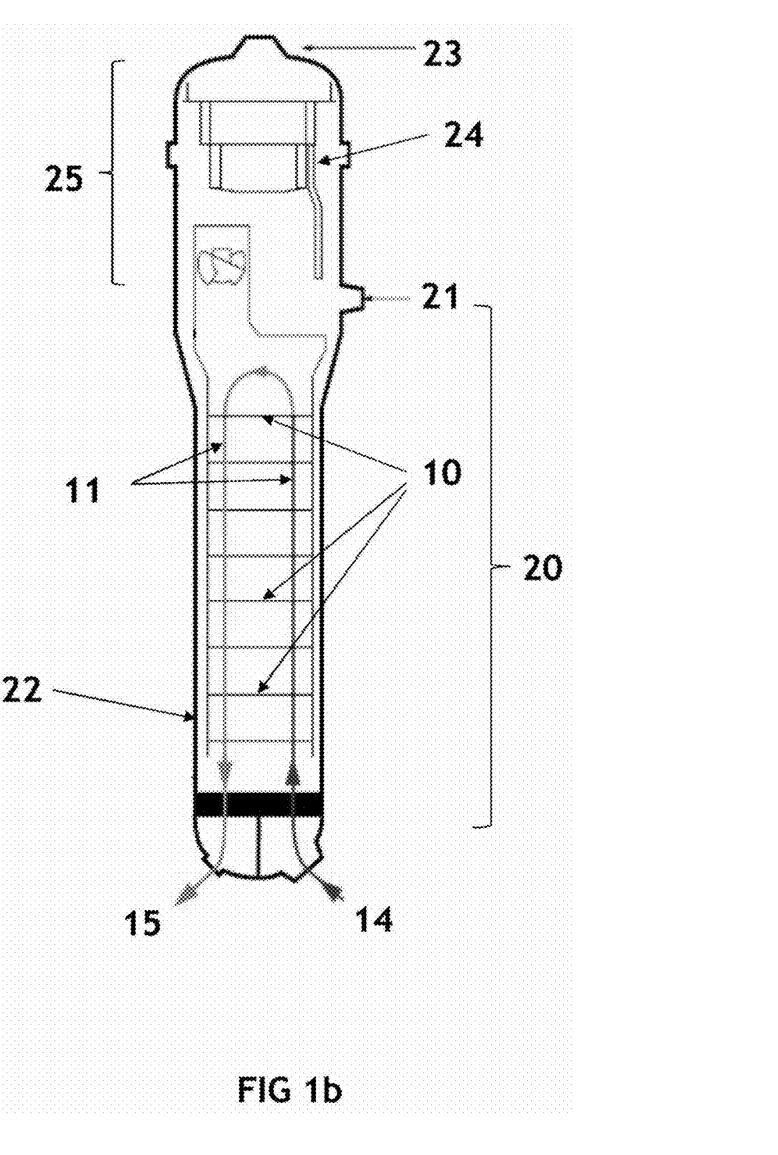

FIGS. 1a-1b illustrate an example of steam generator respectively in exploded perspective and in section. It is divided into two parts: a heating body 20 (called "riser") exclusively within which the water of the primary circuit circulates (from an intake 14 towards an outlet 15), and a steam zone 25 (called dome) filled with generated water vapour. The liquid water of the secondary circuit enters via an intake 21 at the apex of the heat zone 20.

Configured in this way, heat exchange between the primary circuit and the secondary circuit takes place within the heat zone 20 via a plurality of tubes 11 in an "inverse U". Said tubes 11 are held in place by spacer plates 10 immobilised by tie rods fixed in the low part of the steam generator.

Models of steam generators generally contain eight or nine spacer plates 10, and the overall height of such generators is of the order of twenty metres.

Water from the secondary circuit first follows a descending path in an annular external space 22 (called "downcomer") defined by the space left between the external envelope of the steam generator and an internal envelope, the seat of heat exchanges comprising the bundle of tubes 11.

Hot leg refers to that half of the heat zone 20 constituted by the branches of the tubes in which water is ascending (right side in FIG. 1b), and cold leg the other half constituted by the branches of tubes in which the water is descending and colder than that of the hot leg (left side in FIG. 1b). Water from the secondary circuit circulating in the heat zone 20 sees its steam quality increase as it ascends.

The motor force driving this ascending circulation of water in the heat zone 20 results from the difference in volume masses between the descending water column in the annular space and the ascending one in the diphasic state in the heat zone 20. This a natural thermosiphon operation.

The cooled water of the primary circuit leaves the steam generator via the outlet 15. The generated water vapour escapes via the outlet 23 of the secondary circuit at the apex of the steam zone 25. Inside this zone non-evaporated water is recovered by a recovery device called drying frame 24 and falls back into the downcomer 22.

To return to the tubes 11 of the steam generator, as explained the latter are held by the spacer plates 10 arranged generally perpendicularly to the tubes which pass them.

To allow the ascending fluid which vaporises to pass through, the passages of these spacer plates 10 are branched, that is, their form presents lobes around the tubes. As the water passes from the liquid state to the state steam, it deposits all the matter it contained (typically oxides). If the deposits of matter form in the lobes they diminish free passage: it is the fouling which therefore becomes the progressive blocking, by way of deposits, of holes intended for passage of the water/steam mixture.

Figure 2:
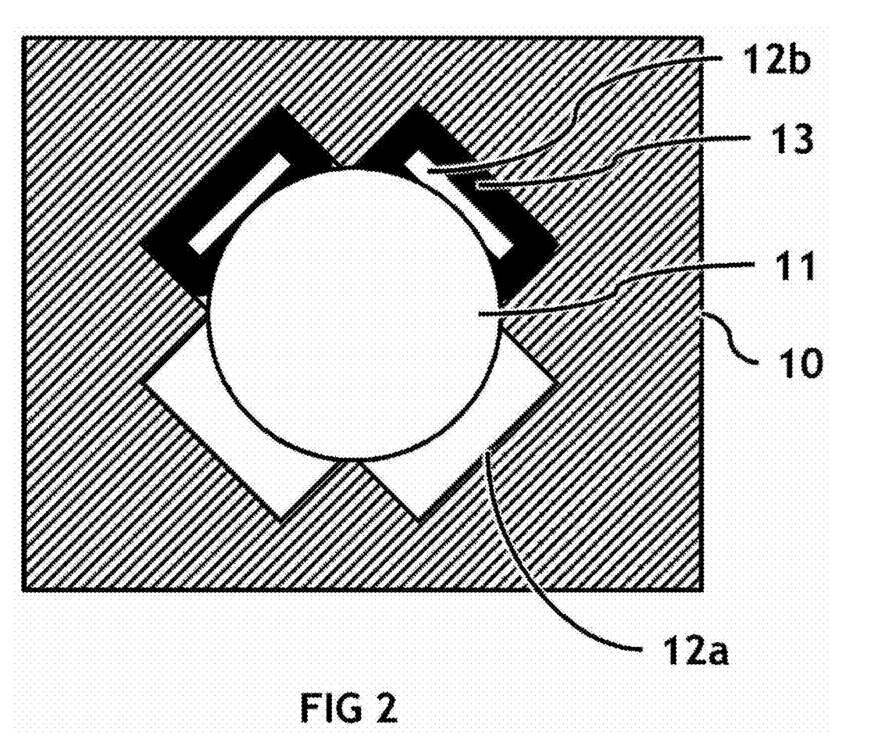
FIG. 2, already commented on, in a plan view, illustrates a branched passage in a spacer plate, in which a tube passes, according to a current configuration of a steam generator.

FIG. 2 schematically illustrates a plan view of a branched passage in a spacer plate 10, in which a tube 11 passes. The lobes 12a and 12b allow the water to pass through the spacer plate 10 along the tube 11, in this way allowing circulation of the water in the steam generator. A deposit 13 is visible at the level of the lobe 12b, clogging said lobe 12b. The deposit can be located on the side of the tube and/or on the side of the plate.

Fouling leads to modifications in the water flow in the steam generator, and in this way favours the appearance of excessive vibrations in the tubes, as well as causing considerable mechanical forces on the internal structures of the steam generators. More precisely, four risks caused by fouling have been identified:

- Perturbation of the velocity field can engender vibratory instability endangering the integrity of the tubes 11;
- During a very fast power transient oscillations in pressure and temperature can appear and reverberate on the core of the nuclear reactor;
- Localised increase in load on spacer plates 10 can break tie rods which hold them in place;
- A drop in recirculation rate, and therefore water mass in the steam generator can compromise its capacity to extract residual heat following a loss in water supply.

This degradation therefore has effects on both the safety and performance of installations. It is therefore indispensable to fully understand the nature and evolution of this degradation.

It is well known to clean spacer plates using chemical cleaning processes to lessen these deposits, especially of oxides, which create fouling. These processes consist of injecting chemical reagents into the secondary circuit of steam generators to destroy and dissolve these deposits.

But the quantity of reagents to be injected depends on the quantity of oxides present in the steam generators and conditions the quantity of effluents to be treated resulting from the cleaning regime. These effluents are an additional source of disadvantages for the operator to undergo due to limitations imposed by authorities. Evaluation of the quantity of deposits of oxides in steam generators then optimally determines the periodicity of such cleaning regimes.

As a consequence, it is previously necessary to monitor as reliably as possible the presence and evolution of deposits which foul branched passages. However the principal challenge of the diagnosis of fouling stems from the difficulty of access of the interior of steam generators and the absence of internal sensors.

This is why estimation of fouling is done during outages for upkeep, either by video (with a robot fitted with a camera) or via an axial eddy current probe. This is currently the only non-destructive inspection system which is capable of accessing all tubes/spacer plate intersections of steam generators.

Eddy currents appear in a conductive material when the magnetic flux is varied nearby. A multifrequency eddy current probe is made to circulate in a tube of said exchanger and a measuring signal is measured with the latter as a function of the environment in which the probe is located, from which information as to anomalies in the heat exchanger can be extracted.

A variation in magnetic induction, typically via a coil in which an alternating current circulates, engenders eddy currents, whereof the variation caused of the magnetic field is detected. Typically, the difference in voltage engendered by the variation in impedance of the coil is measured.

Exploiting the measuring signals of this eddy current probe does not prolong downtime of the steam generator, since this eddy current probe is already utilised during outages, especially for inspecting the integrity of tubes of the steam generator. This eddy current probe, initially intended to detect damage to the tubes, is also sensitive to fouling.

However, these methods have the disadvantage of being intrusive, requiring mobilisation of material and human resources for their realisation. In fact, interpretation of the signal of the probe is currently done manually by specialist operators, which is very long, of the order of around one week of processing for analysis of a single steam generator. Also, intervention by an operator to record measurements from analysis software often results in a bias difficult to quantify.

Also, the measuring signal is not calibrated and is noisy, such that its exploitation can prove difficult.

Evaluation of the fouled aspect of a branched passage by an operator of the measuring signal is also not very reliable, generally being carried out empirically in light of the signal received and its comparison with other signals corresponding to other passages of known state, for example by video inspection.

Based on this observation, a method has been proposed known as "dynamic NGL" (see in particular the document "Diagnosis of fouling of steam generators by means of physical and statistical models", S. Girard, Thesis of the National Advanced School for Mines of Paris, December 2012) using sensors intended for measuring water levels in the steam generator.

The term of water level applies in the proper sense only in the "tank", that is, the arrival space for water from the secondary circuit, at the top of the downcomer 22. In fact, the steam in the riser 20 is not separated from the liquid water by a free surface: the fluid circulating there is a mixture the degree of which increases progressively.

The level in the tank is monitored and regulated by the control-command system. An excessively low level would run the risk of onset vaporisation in the core since the extraction of heat by the steam generator would be insufficient. Inversely, an excessive level would cause considerable humidity of the steam which can be damaging to turbines.

The level is estimated from the pressure difference between two instances of pitting located on different sides. Measuring is therefore affected, inter alia, by variations in volume mass of the fluid. It is also sensitive to losses in parasitic loads and to the heterogeneity of flow in the downcomer 22.

Figure 3:
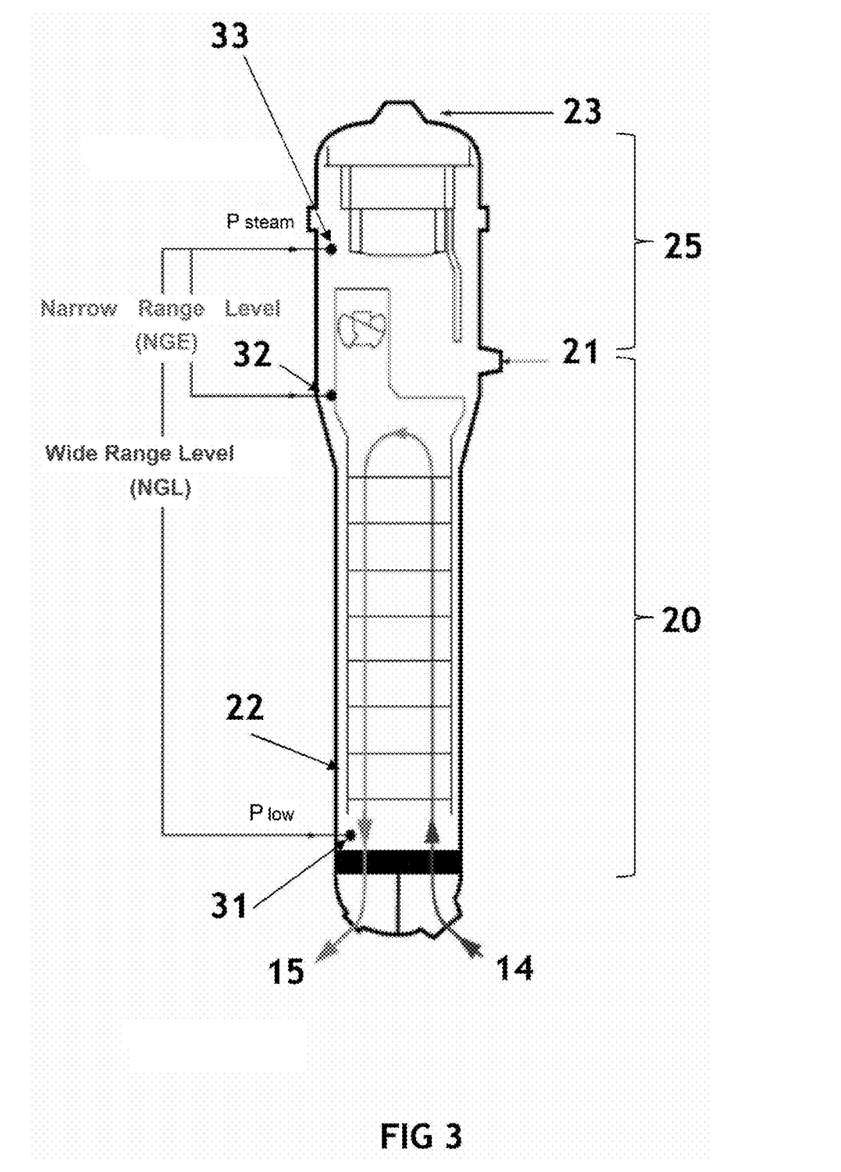
FIG. 3, already commented on, schematically illustrates the instrumentation of the steam generator of FIGS. 1a-1b.

In reference to FIG. 3, sensors 31, 32, 33 are installed at three heights of the steam generator. The first sensor 31 measures the pressure in the secondary circuit at the bottom of the steam generator, i.e. in the downcomer 22 at the "turn" prior to the rising. The second sensor 32 measures the pressure in the secondary circuit at the bottom of the tank (apex of the riser 20), i.e. around the level of the water influx. The third sensor 33 measures the pressure in the secondary circuit at the apex of the dome 25 (apex of the steam generator, towards the steam outlet point 23).

The "narrow range level" (NGE, "Niveau de gamme étroite" in french) is used to control the water rate coming from the secondary circuit. It is deduced from the difference in pressure between the second and the third sensors 32, 33. Apart from very fast transients which can disrupt measuring, for example in the event of accidental depressurisation, the narrow range level is kept constant.

The "wide range level" (NGL, "Niveau de gamme large" in french) per se is deduced from the difference in pressure between the first and the third sensors 31, 33. It is consequently much more sensitive to temperature and flow rate of water of the secondary circuit, as well as to the recirculation rate. It is used to monitor the level only during slowly variable phases, especially as an aid to manual operation at low loads. During faster transients, measuring the NGL is no longer representative of the level as it is overly affected by dynamic pressure. It is this effect which allows diagnosis of fouling.

In stationary power phase rates are constant. The presence of fouling heightens the resistance of the passage of water in the riser 20 as it reduces the cross-section of passage of water, diminishing the steam flow and consequently the rate in the recirculation loop, therefore load losses in the downcomer 22 increase the value of measurement NGL. This measurement gives an indication of tendency of presence of fouling, and not an absolute value.

The document cited above has shown that to appreciate the quantity of presence of fouling it was advantageous to carry out power transients, that is, dynamically, as the alteration in thermohydraulics of the steam generator was even more contrasted according to whether there is presence of fouling or not.

The principle is to simulate the response of the NGL dynamically, from a model, during a power transient for different states of fouling and compare the responses of curves obtained to measurements recorded by sensors during real transients carried out according to fairly similar profiles of lowering power.

Such transients have the advantage of occurring for example at the time of assay calibration of the control clusters of the power of the reactor, assays during which weighing of the neutron-absorbing capability of said clusters is carried out, that is, of the absorption capability of neutrons at the origin of nuclear fission reactions in the reactor core.

This weighing is done according to a standardised assay protocol where the clusters are inserted progressively into the core of the reactor so as to lower the power according to a previously fixed profile, typically a drop of 50% for ten minutes. These assays have the added advantage of being close enough over time.

Owing to the use of physical and statistical models it has been able to be shown what, in the form of response curves of NGL measurements made over a period of 10 years in a steam generator, was revelatory of the state of its fouling.

Another approach is that of previously choosing NGL response profiles for different configurations of fouling deemed interesting according to a model and comparing the profiles; this is the method for diagnosis of selected profile.

The results obtained by the "Dynamic NGL" method which seemed promising from a few assays on 900 MW units found their limit of applicability on the units of higher power levels, 1300 MW, 1400 MW, etc.

The major disadvantage of the "dynamic NGL" method relates to its sensitivity to substantial variations of the water level in the downcomer 22 faced with the transients of a fast power drop or increase. These considerable variations are attributed to the difficulty of regulation to efficiently correct variations in the water level of the steam generator in these transients.

Due to these limits application of this method of the "dynamic NGL" disallows pertinent monitoring of fouling.

In light of critical problems in particular for safety, it would be preferable to have a novel method for evaluation of fouling of passages of a spacer plate of a tubular heat exchanger which is more effective, more reliable and more generic.

BRIEF SUMMARY OF THE INVENTION

According to a first aspect of the invention, a method is proposed for evaluation of fouling of passages of a spacer plate of a tubular heat exchanger, said passages being arranged along the tubes for fluid to pass through the spacer plate, in which
- a first pressure sensor is arranged at a low altitude of the heat exchanger;
- a second pressure sensor is arranged at a medium altitude of the heat exchanger;
- a third pressure sensor is arranged at a high altitude of the heat exchanger;

The method comprising performing by a data-processing unit steps of:
- (a) during a transient operation phase of the heat exchanger determination of a value over time of Wide Range Level NGL, from the measurements of the first and third pressure sensors, and of a value over time of Narrow Range Level NGE, from the measurements of the second and third pressure sensors;
- (b) determination of a value over time of Steam Range Level deviation $\Delta NGV$, the Steam Range Level deviation corresponding to the Wide Range Level whereof a component representative of a variation in free water surface has been filtered in the heat exchanger, from the values of NGL and NGE;
- (c) comparison of the determined value of $\Delta NGV$ with a set of reference profiles $\Delta NGV_i$ for said transient operation phase of the heat exchanger, each reference profile $\Delta NGV_i$ being associated with a level of fouling, so as to identify a target reference profile $\Delta NGV_{opt}$ among the reference profiles $\Delta NGV_i$ for said transient operation phase of the heat exchanger, which is that closest to the determined value $\Delta NGV$.
- (d) restored on an interface of the level of fouling associated with the identified target reference profile $\Delta NGV_{opt}$.

This method is advantageously completed by the following characteristics, taken singly or in any of their technically possible combinations:
- the heat exchanger is a steam generator having a heat zone and a steam zone located at an altitude greater than the heat zone, the tubes extending in the heat zone only;
- the first pressure sensor is arranged substantially at the bottom of the heat zone, the second sensor is arranged substantially at the top of the heat zone, and the third exchanger is arranged substantially at the top of the steam zone;
- the value over time of $\Delta NGV$ is determined from the values of NGL and NGE by the formula $\Delta NGV = NGL - NGE$;
- the level of fouling is a rate of fouling expressed between 0 and 1;
- the method comprises a previous step (a0) for generation of said set of reference profiles $\Delta NGV_i$ during said transient operation phase of the heat exchanger;
- step (a0) comprises performing steps (a) and (b) for a reference heat exchanger similar to said heat exchanger during at least two occurrences of said transient operation phase respectively associated with a first level of known fouling and a second level of known fouling greater than the first level of fouling, to obtain a first reference profile $\Delta NGV_{Level_{low}}$ during said transient operation phase of the heat exchanger for the first level of fouling and a second reference profile $\Delta NGV_{Level_{low}}$ during said transient operation phase of the heat exchanger for the first level of fouling, the other reference profiles $\Delta NGV_i$ during said transient operation phase of the heat exchanger being calculated from the first and second profiles $\Delta NGV_{Level_{low}}$ and $\Delta NGV_{Level_{low}}$.
- the other reference profiles $\Delta NGV_i$ are calculated from the first and second reference profiles $\Delta NGV_{Rate_{low}} = \Delta NGV_{Level_{low}}$ and $\Delta NGV_{Rate_{high}} = \Delta\Delta NGV_{Level_{high}}$ by using the formula $$\Delta NGV_i = \frac{(Rate_{high} - Rate_i) \cdot \Delta NGV_{rate_{low}} + (Rate_i - Rate_{low}) \cdot \Delta NGV_{Rate_{high}}}{(Rate_{high} - Rate_{low})}.$$

for each level of fouling considered, step (a0) comprises performing steps (a) and (b) for said reference heat exchanger similar to said heat exchanger during at least three occurrences of said transient operation phase associated with said level of fouling, so as to obtain at least three real profiles $\Delta NGVr$ during said transient operation phase of the heat exchanger for said level of fouling, the obtaining of the reference profile $\Delta NGV_i$ during said transient operation phase of the heat exchanger for said level of fouling comprising calculating an average of the real profiles $\Delta NGVr$ then approximation of said average by a given function.

According to a second aspect equipment is proposed comprising a data-processing unit connected to a first pressure sensor, a second pressure sensor and a third pressure sensor, configured for executing the method according to the first aspect of the invention.

According to a third aspect a set of equipment is proposed according to the second aspect and a tubular heat exchanger, in which the first pressure sensor is arranged at a low altitude of the heat exchanger;

the second pressure sensor is arranged at a medium altitude of the heat exchanger;

the third pressure sensor is arranged at a high altitude of the heat exchanger.

The invention also relates to a computer program product comprising program code instructions for performing the steps of the method according to the first aspect of the invention, when said program is run on a computer.

BRIEF DESCRIPTION OF THE DRAWINGS

Other characteristics, aims and advantages of the invention will emerge from the following description which is purely illustrative and non-limiting and which must be considered with respect to the appended drawings, in which.

DETAILED DESCRIPTION OF THE DRAWINGS

Architecture

Figure 4:
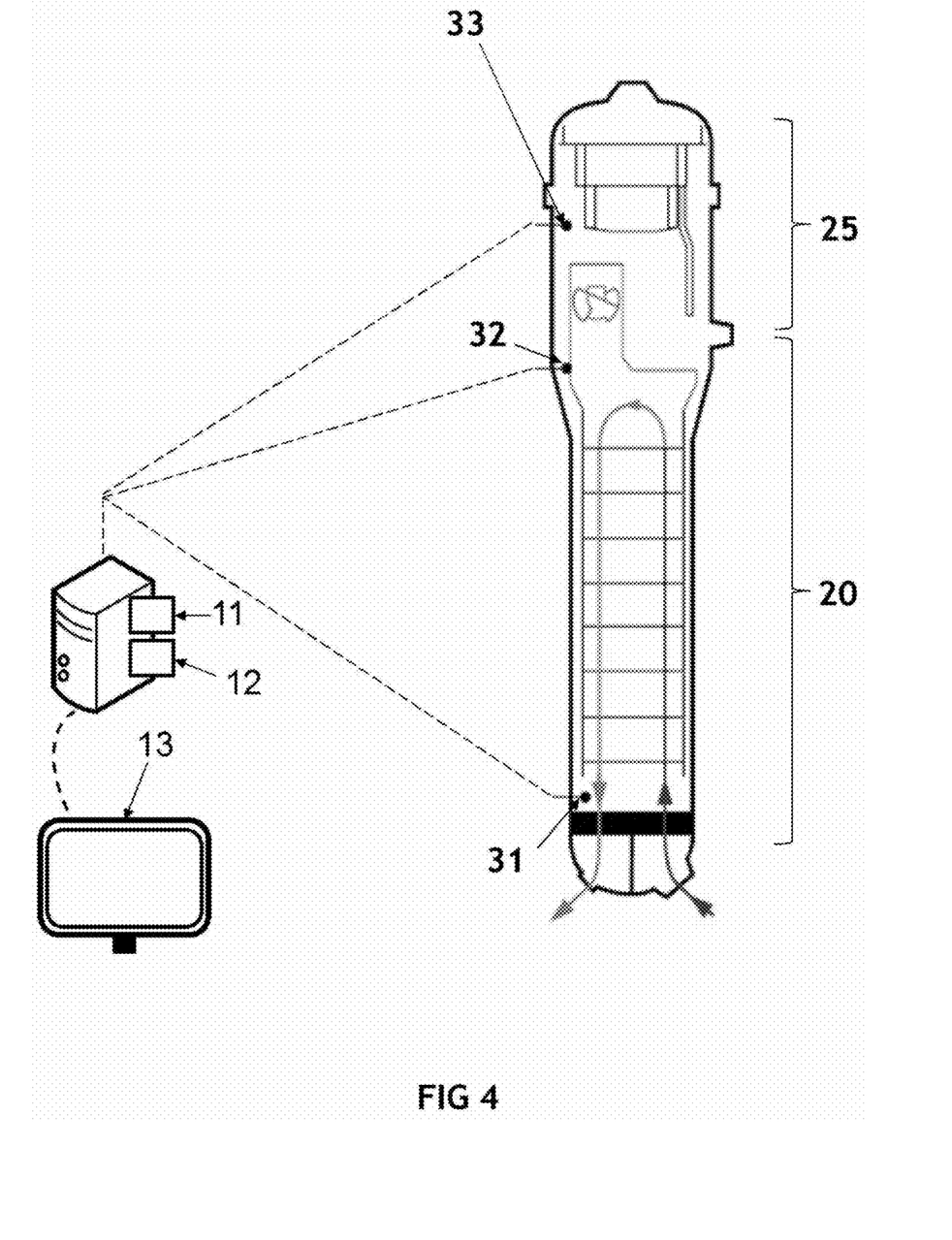
FIG. 4 illustrates architecture for executing the present method.

In reference to FIG. 4, a method is proposed for evaluation of fouling of passages of spacer plates 10 of a tubular heat exchanger 11, said passages 12a, 12b being arranged along the tubes 11 for fluid to pass through the spacer plate 10.

The tubular heat exchanger is preferably a steam generator of the type described in the introduction.

This method is a refinement of dynamic NGL techniques and utilises pressure measurements coming from the first, second and third pressure sensors 31, 32, 33.

In general:

The first sensor 31 is at a low altitude of the heat exchanger;

The second sensor 32 is at a medium altitude of the heat exchanger;

The third sensor 33 is at a high altitude of the heat exchanger.

Given a steam generator having a heat zone 20 in which the tubes 11 and a steam zone 25 extend above the heat zone, then preferably ("high" and "low" extend in terms of altitude):

The first sensor 31 is arranged substantially at the bottom of the heat zone 20 (low part of the downcomer 22);

The second sensor 32 is arranged substantially at the top of the heat zone 20 (i.e. substantially at the bottom of the steam zone 20);

The third exchanger 33 is arranged substantially at the top of the steam zone 25.

The present method is executed by a processing unit 1 (for example one or more processors) of equipment, for example a server, connected to the pressure sensors 31, 32, 33 so as to have measurements of associated pressures.

The equipment can comprise a memory 2 (for example a hard drive) for storing data, and an interface 3 for interaction with an operator.

Delta NGV

The equation of the pressure at the bottom of the steam generator can be expressed as follows:

$$P_{bas} = \rho \text{downcomer} \cdot g \cdot z_{surface} + P_{dome} - pdc$$

Pdc: loss of reference load in the downcomer $P_{base}$: pressure measured at the level of the first sensor 31

$P_{dome}$: pressure measured at the level of the third sensor 33

$\rho_{downcomer}$: volume reference mass $z_{surface}$: designates the altitude of the surface of the water (i.e. the water level) relative to the altitude of the first sensor 31.

As explained, fouling increases the resistance of passage of water in the riser 20 as it reduces the passage cross-section of the water, decreasing the steam flow and consequently the flow in the recirculation loop and therefore losses in load Pdc in the downcomer 22 and lowering the value of $P_{dome}$.

Variations in the exchanged power of the steam generator, the phase changes inside the heat zone 20 (liquefaction in cooling or evaporation in a power increase) generate violent thermohydraulic transients. These transients will act strongly on the pressure at the base of the steam zone 25 (i.e. at the level of the second pressure sensor 32), sensitive to the downcomer flow rate, as well as on the pressure at the apex of the steam zone 23 (i.e. at the level of the third pressure sensor 33) and as a consequence are particularly adapted to the qualification of losses of internal loads of the steam generator, directly connected to fouling.

However, the pressure measurement at the base of the heat zone 20 (i.e. at the level of the first pressure sensor 31) is also representative of the altimetry of the free surface of the water in the generator. This water height is not representative of the behaviour of the steam generator but solely of the quality of water regulation. As a consequence its variations substantially complicate interpretation of the low-pressure signal of the first pressure sensor 31.

The NGE is conventionally used for fine regulation of the water height (over a range of 1 m) in the steam generator as an operation, and it controls the drinking water inlet valves of the steam generator as a nominal operation of the installation. As is familiar for the skilled person NGE is a function of the difference between the pressure measurements of the second and third sensors 33.

The NGL per se monitors (over a range of more than 15 m) the water level of the steam generator when the plant starts up, when stopped and in abnormal operating situations (when the second pressure sensor 32 is dewatered).

The present method uses a novel indicator called ΔNGV (delta NGV, "steam range level deviation", "écart de niveau gamme vapeur" in french) which uses the respective sensibilities of the NGE (which provides a clear indicator of the real water level of the steam generator) and of the NGL (sensitive to variations in level, to variations in flow and temperature via the volume mass of the water of the downcomer) to construct an indicator specifically targeting the magnitudes impacted by fouling.

The ΔNGV is based on the NGL from which the component has been filtered due to the variation in free surface (incarnated by the NGE measurement), and it then corrects the NGL, insufficient up to this time to the effective characterisation of fouling. In practice this variation is not in fact correlated to fouling of the steam generator but only to the conduct of the ARE regulation.

This indicator is determined from the values of NGL and NGE preferably by the formula $\Delta NGV=NGL-NGE$.

The values $\Delta NGV$, NGL and NGE are expressed advantageously in mCE (water column metres), or in a pressure unit (bar, pascal, etc.) or as a percentage relative to maximum levels.

Figure 6A:
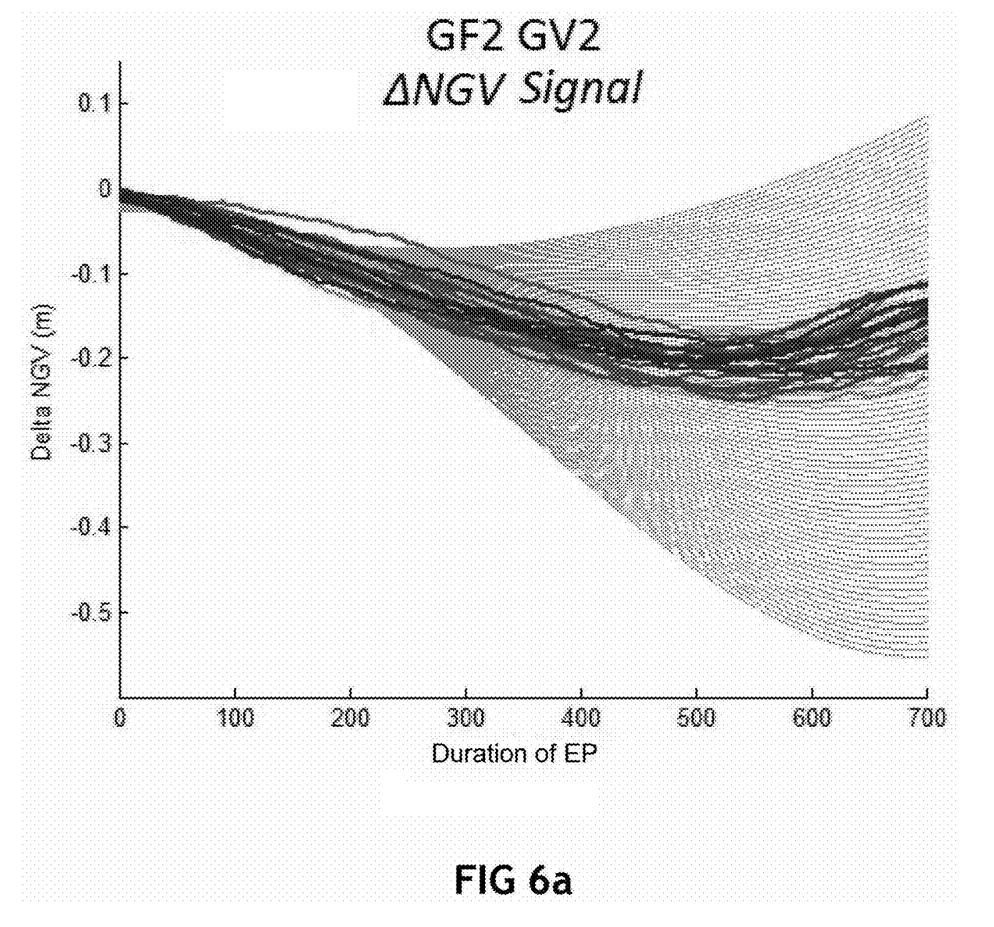
FIGS. 6a and 6b illustrate examples respectively of signal ΔNGV and NGL.
Figure 6B:
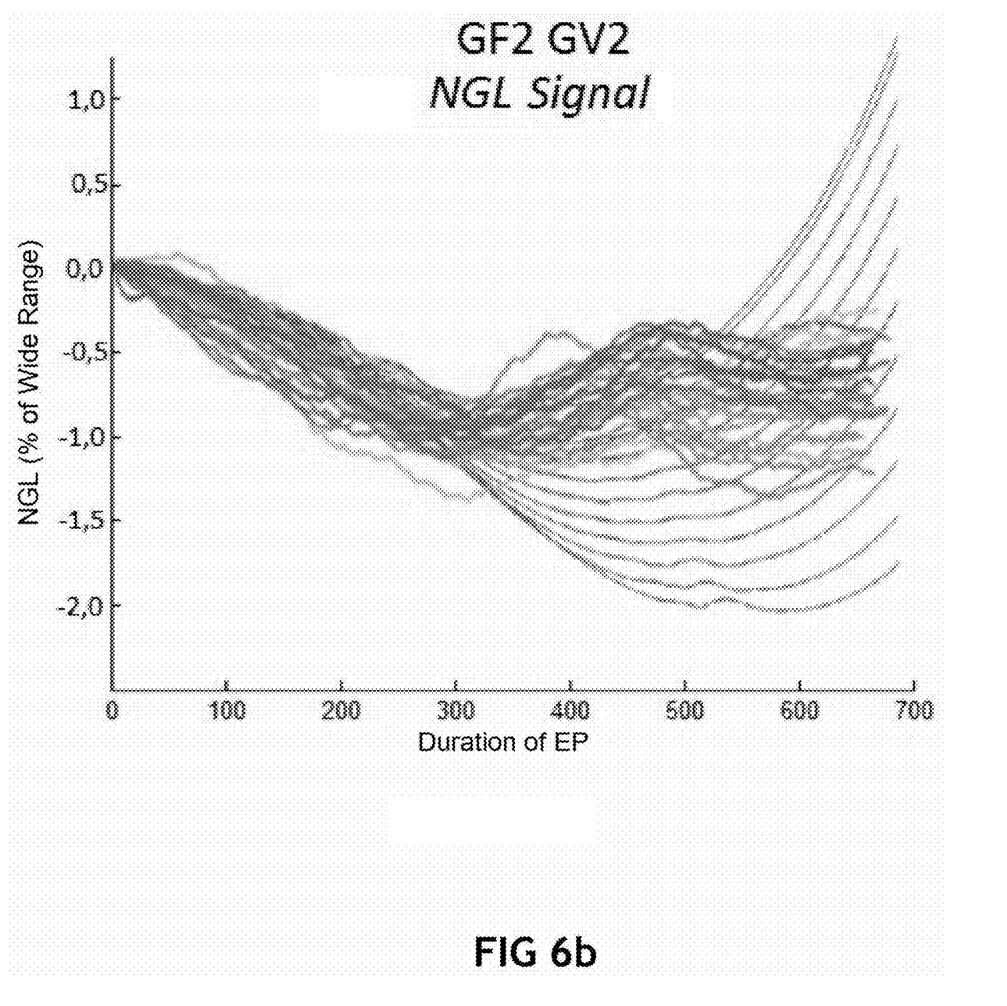

As is clear from FIGS. 6a and 6b, the "bump" observable at two thirds of the NGL signal, which is symptomatic of a variation of the real level in the GV, is completely filtered on the $\Delta NGV$ signal.

Process

Figure 5:
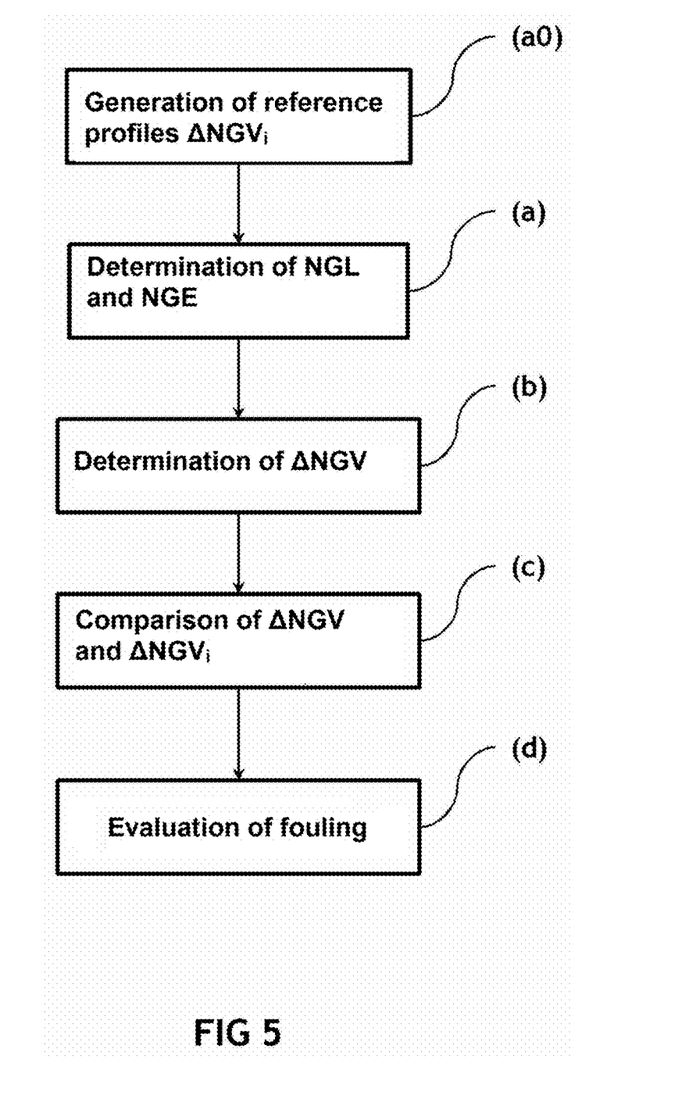
FIG. 5 is a block diagram of the method for evaluation of fouling.

In reference to FIG. 5, the method begins as explained by a step (a) for determination by the data-processing unit 1, during a transient operation phase of the heat exchanger, of a value over time of the Wide Range Level NGL, from the measurements of the first and third pressure sensors 31, 33, and of a value over time of the Narrow Range Level NGE, from the measurements of the second and third pressure sensors 31, 33.

In general, "transient operation phase" means a dynamic phase during which the level of heat energy brought to the heat exchanger fluctuates. A transient operation phase can be defined by an associated value of Active Electric Power (AEP) so as to grasp its kinetics.

Said transient phase is in particular that occurring during regulated standardised periodic assays such as "EP RGL 4" on 900 MW nuclear plants (CP1 and CP2 units) and 1300 MW plants, but many other periodic assays of the EP RGL, EP RCP, EP RPN, etc. family.

It is also quite possible to apply this method during procedures for islanding, automatic stopping of the reactor, turbine triggering, etc. and even as normal operation during load-monitoring transients (power tapping or drop according to the request of the electric network manager).

As will become evident later from the text, the present method uses reference profiles for given transient operating phases ("abacuses") and it suffices that a transient operation phase similar to that of a reference profile takes place so the present method can be applied.

The skilled person can calculate the values of NGE and NGL from the pressure measurements, these indicators being classic.

The duration of transient operating phases (in other terms the time interval during which the value of NGL or NGE is determined) is generally of the order of a few tens to a few thousands of seconds, preferably a few hundreds of seconds.

In the examples of FIGS. 6b and 7a-7c, the duration of the transient operation phase is within a time interval of between 500 and 1500 seconds.

In a second step (b) the data-processing unit 1 determines the value over time (over the same duration of the transient operation phase) of the Steam Range Level deviation $\Delta NGV$, the Steam Range Level deviation corresponding to the Wide Range Level from which a component representative of a variation in free water surface in the heat exchanger has been filtered from the values of NGL and NGE.

As explained, this operation is preferably the difference between the value of the NGL and the value of the NGE ($\Delta NGV=NGL-NGE$) since the NGE is representative of the variation in free water surface.

The value over time of the NGL, NGE or $\Delta NGV$ is also called respectively NGL, NGE or $\Delta NGV$ "signal".

Statistical processing will be executed conventionally and preferably by zero centering and by moving average of signals so as to standardise them (both in step (a) and in step (b)).

In a step (c) the processing unit 1 compares the value of $\Delta NGV$ to a set of reference profiles $\Delta NGV_i$ for said transient operation phase of the heat exchanger, each reference profile $\Delta NGV_i$ being associated with a level of fouling.

More precisely, there can be a database of reference profiles $\Delta NGV_i$ defined for a type of transient operation phase and a level of fouling. It should be noted that there can even be different databases of reference profiles $\Delta NGV_i$ associated with several types of heat exchangers. The reference profiles $\Delta NGV_i$ can be stored in the memory 2.

The level of fouling must be understood as a parameter representative of the extension of fouling, for example a rate between 0 and 1: a zero rate corresponds to complete absence of fouling (passage 12a, 12b completely open) and a rate of 1 corresponds to complete fouling (passage completely blocked 12a, 12b).

Figure 7A:
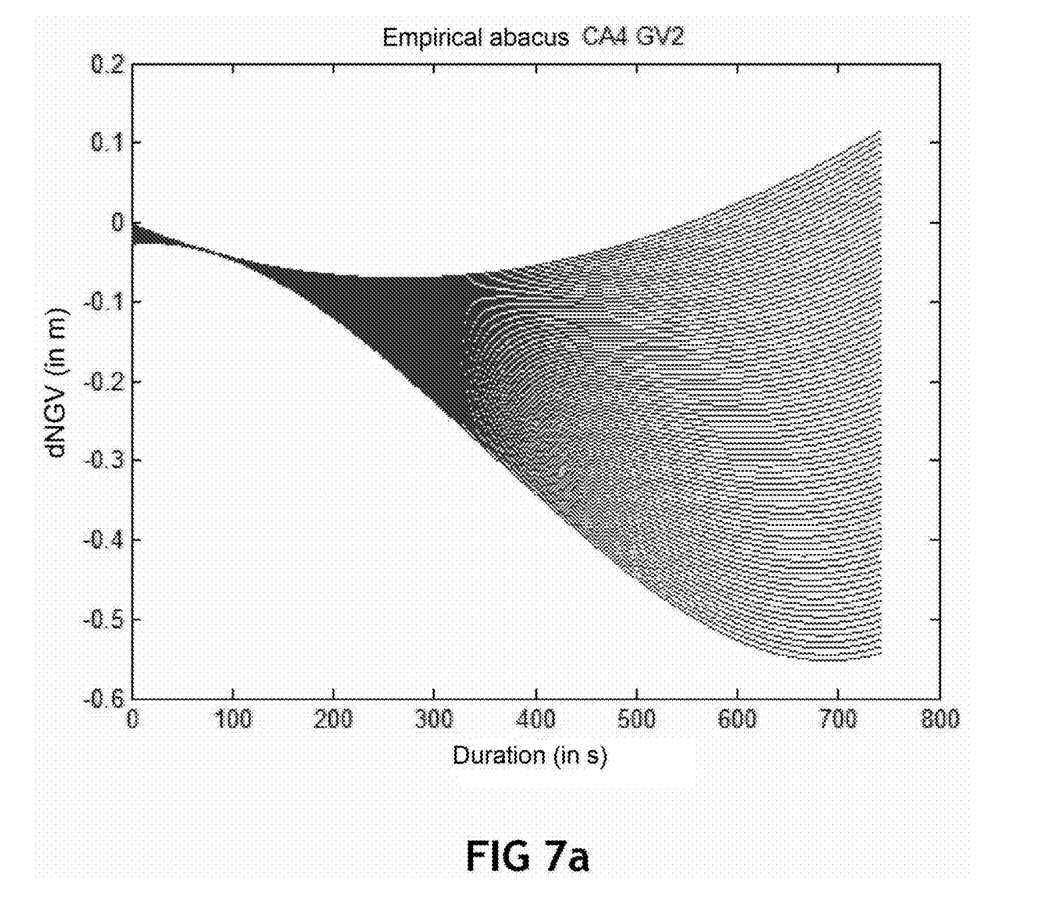
FIGS. 7a to 7c illustrate the rate of signals used to obtain a set of reference profiles $\Delta NGV_i$.

The set of reference profiles $\Delta NGV_i$ defined for a type of transient operation phase (i.e. for the whole range of fouling levels) forms a "bundle" of reference profiles such as shown in the example of FIG. 7a (for a transient operation phase of type EP RGL 4) called abacus.

The lower the level of fouling, the faster the value of $\Delta NGV$ rises. In other terms the profiles at the bottom of the bundle correspond to high levels of fouling, and the profiles at the top of the abacus correspond to low levels of fouling.

The reference profiles $\Delta NGV_i$ can be determined empirically, in particular by digital simulation. More precisely, based on a model of the relevant heat exchanger the expected responses $\Delta NGV$ for said transient operation phase considered for each level of fouling will be precalculated. In this respect, the method advantageously comprises a previous step (a0) for generation of said set of reference profiles $\Delta NGV_i$ during said transient operation phase of the heat exchanger.

Developing an empirical abacus is preferably done from the knowledge of two real signals $\Delta NGV$ for a heat exchanger similar to that being considered (or even the same), for which the respective levels of fouling are known.

In other terms, step (a0) advantageously comprises performing steps (a) and (b) for a reference heat exchanger similar to said heat exchanger during at least two occurrences of said transient operation phase respectively associated with a first level of known fouling and a second level of known fouling greater than the first level of fouling so as to obtain a first reference profile $\Delta NGV_{Level_{low}}$ during said transient operation phase of the heat exchanger for the first level of fouling and a second reference profile $\Delta NGV_{Level_{high}}$ during said transient operation phase of the heat exchanger for the first level of fouling, the other reference profiles $\Delta NGV_i$ during said transient operation phase of the heat exchanger being calculated from the first and second profiles $\Delta NGV_{Level_{low}}$ and $\Delta NGV_{Level_{low}}$.

In practice, an empirical abacus is preferably based on a real bundle $\Delta NGV$ of a reference range, having ideally undergone cleaning, and whereof there are measurements (for example by video inspection) before and after cleaning which will respectively define the abovementioned high level and the low level, so it can be capable of covering a significant scope of levels of fouling. The extreme and intermediate levels of fouling are then extrapolated linearly from the "support" curves of the abacus.

For each level of fouling considered, step (a0) comprises performing steps (a) and (b) for said reference heat exchanger similar to said heat exchanger during at least three occurrences of said transient operation phase associated with said level of fouling so as to obtain at least three real profiles $\Delta NGV_r$ during said transient operation phase of the heat exchanger for said level of fouling, the obtaining of the reference profile $\Delta NGV_i$ during said transient operation phase of the heat exchanger for said level of fouling comprising calculating an average of the real profiles $\Delta NGV_r$ then approximation of said average by a given function.

In this way, the signal $\Delta NGV$ representative of high rates of fouling ("low" abacus profile) is preferably developed by averaging the three last real signals $\Delta NGVr$ (in particular filtered and standardised) preceding cleaning, or on the date of the highest level of fouling identified over the range, then by approximating this average by a three-degree polynomial.

Similarly, the signal $\Delta NGV$ representative of low levels of fouling is preferably developed by averaging the three first real signals $\Delta NGV$ following cleaning, or on the date of the lowest level of fouling identified over the range), then by approximating this average by a three-degree polynomial.

Figure 7B:
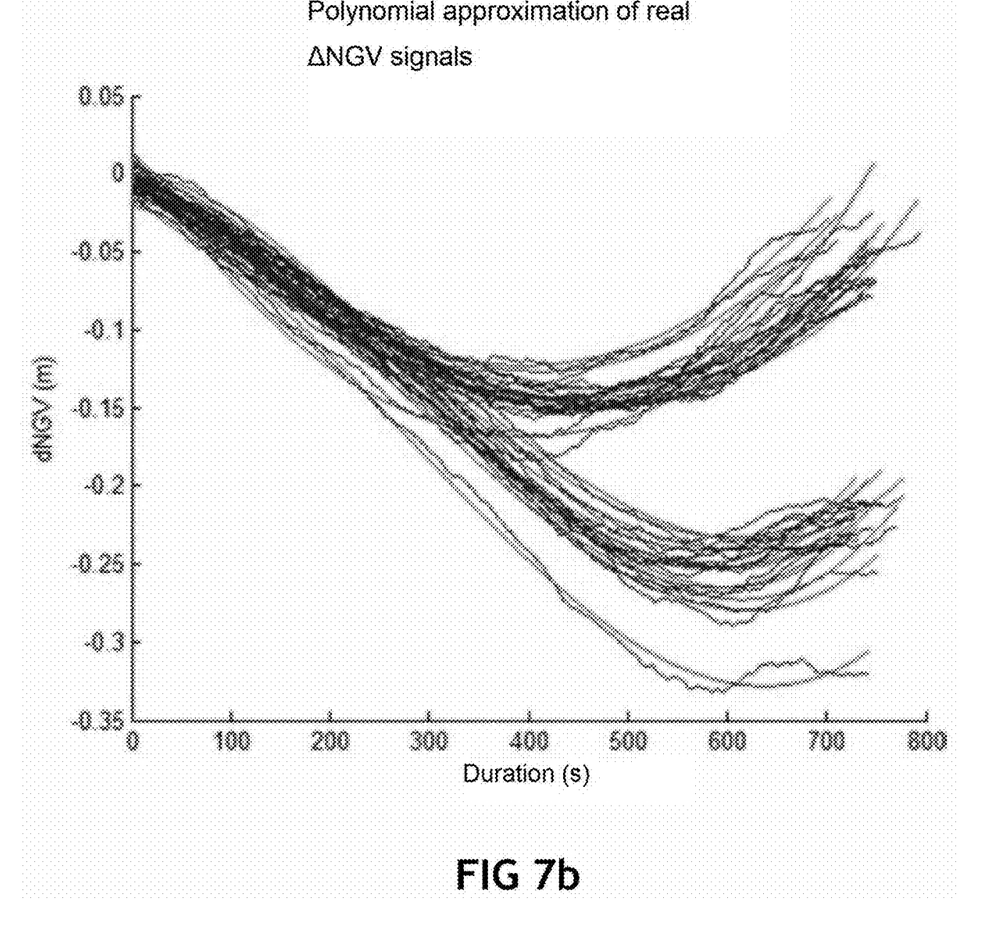
Figure 7C:
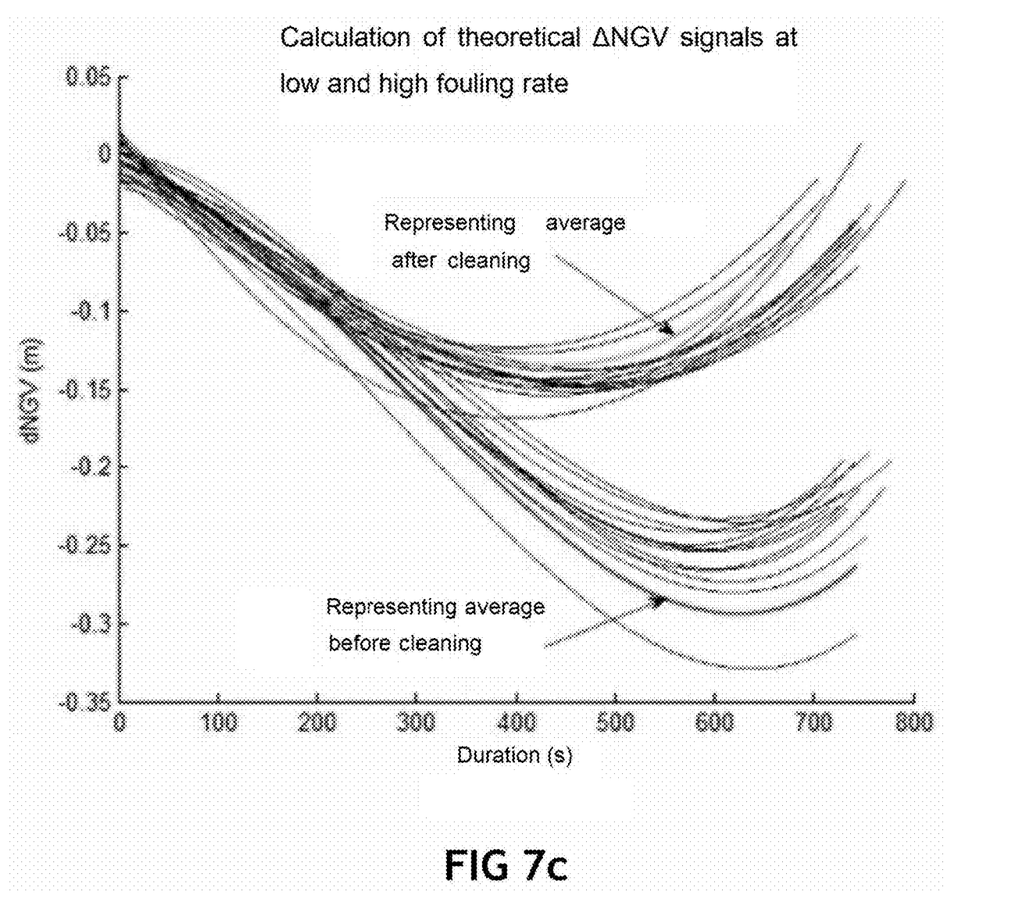

These operations are illustrated in FIG. 7b which represents the polynomial approximation of the set of real signals $\Delta NGV_r$ of a tranche example CA4 GV2 (only the three signals before and after fouling are in reality necessary after this). FIG. 7c represents the calculating of signals $\Delta NGV$ representative of weak and strong levels of fouling, by average respectively of the three EP after and before fouling.

Once these two theoretical signals $\Delta NGV$ have been developed, two levels of fouling must be associated with them, here called $Level_{high}$ and $Level_{low}$ ($Rateh_{high}$ and $Rate_{low}$ in the preferred embodiment where the level of fouling designates a rate of fouling between 0 and 1), from the measurements available. Next, the complete theoretical abacus is developed by interpolation.

Therefore, the theoretical reference signal $\Delta NGV_i$ for a fouling rate $Rate_i$ can be calculated as follows:

$$\Delta NGV_i = \frac{(Rate_{high} - Rate_i) \cdot \Delta NGV_{rate_{low}} + (Rate_i - Rate_{low}) \cdot \Delta NGV_{Rate_{high}}}{(Rate_{high} - Rate_{low})}$$

This results in a complete abacus which can be used for estimating fouling of heat exchangers of the same type by the novel method (FIG. 7a).

It will be clear however that the present method is not limited in this way to obtaining abacuses, and the skilled person can use a multitude of empirical approaches such as "machine learning" in the broad sense (deep learning, neurone networks, etc.).

Returning to the method for evaluation of fouling, the result of the comparison of step (c) identifies a "target" reference profile $\Delta NGV_{opt}$ which is that closest to the measured profile (value over time of $\Delta NGV$ obtained on completion of step (b)). The skilled person is aware of tools for identifying the most similar profile among a plurality of profiles for example by taking the difference of least squares.

The level of fouling associated with the "target" reference profile $\Delta NGV_{opt}$ constitutes a reliable estimation of the fouling of passages of the spacer plate 10 of the relevant heat exchanger, and in a step (d) this level of fouling with the identified target reference profile $\Delta NGV_{opt}$ can be restored on an interface 3.

Equipment

According to a second aspect equipment is proposed such as shown in FIG. 4. It comprises a processing unit 1, a memory 2 and an interface 3. The processing unit 1 is connected to the first pressure sensor 31, the second pressure sensor 32 and the third pressure sensor 33, and is configured for executing the method according to the first aspect.

A set of this equipment and of the tubular heat exchanger 11 (i.e. the steam generator), or even of the nuclear plant which comprises it, is also proposed.

The invention also relates to a computer program product comprising program code instructions recorded on a carrier which can be used in a computer for performing steps for carrying out the method for evaluation of fouling, when said program is run on a computer.

As a result, the pressure measurements of the sensors 31, 32, 33 are transmitted to the memory 2 to be stored there in light of its processing. This processing of measuring data to which the present invention refers is carried out by a processing unit fitted with a calculator, typically a computer provided with an interface 3, by which it acquires the measuring signal and transmits the results of executing the method for evaluation of fouling, said computer being configured to execute the method according to the invention.

The invention claimed is:

1. A method for evaluation of fouling of passages of a spacer plate of a tubular heat exchanger, said passages being arranged along the tubes for fluid to pass through the spacer plate, wherein
   a first pressure sensor is arranged at a low altitude of the heat exchanger;
   a second pressure sensor is arranged at a medium altitude of the heat exchanger;
   a third pressure sensor is arranged at a high altitude of the heat exchanger;
   the method comprising performing by a data-processing unit steps of:
   (a) during a transient operation phase of the heat exchanger, determining a value over time of Wide Range Level, NGL, from the measurements of the first and third pressure sensors, and of a value over time of Narrow Range Level, NGE, from the measurements of the second and third pressure sensors;
   (b) determining a value over time of Steam Range Level deviation, $\Delta NGV$, the Steam Range Level deviation corresponding to the Wide Range Level from which a component representative of a variation in free water surface in the heat exchanger has been filtered, from the values of NGL and NGE;
   (c) comparing the value of $\Delta NGV$ determined with a set of reference profiles $\Delta NGV_i$ for said transient operation phase of the heat exchanger, each reference profile $\Delta NGV_i$ being associated with a level of fouling, so as to identify a target reference profile $\Delta NGV_{opt}$ among the reference profiles $\Delta NGV_i$ for said transient operation phase of the heat exchanger, which is that closest to the determined value $\Delta NGV$; and
   (d) outputting on an interface the level of fouling associated with the identified target reference profile $\Delta NGV_{opt}$.

2. The method according to claim 1, wherein the heat exchanger is a steam generator having a heat zone and a steam zone located at an altitude greater than the heat zone, the tubes extending in the heat zone only.

3. The method according to claim 2, wherein the first pressure sensor is arranged substantially at the bottom of the heat zone, the second sensor is arranged substantially at the top of the heat zone, and the third exchanger is arranged substantially at the top of the steam zone.

4. The method according to claim 1, wherein the value over time of ΔNGV is determined from the values of NGL and NGE by the formula ΔNGV=NGL−NGE.

5. The method according to claim 1, wherein the level of fouling is a rate of fouling expressed between 0 and 1.

6. The method according to claim 1, comprising a previous step (a0) for generation of said set of reference profiles $\Delta NGV_i$ during said transient operation phase of the heat exchanger.

7. The method according to claim 6, wherein step (a0) comprises performing steps (a) and (b) for a reference heat exchanger similar to said heat exchanger during at least two occurrences of said transient operation phase respectively associated with a first level of known fouling and a second level of known fouling greater than the first level of fouling so as to obtain a first reference profile $\Delta NGV_{Level_{low}}$ during said transient operation phase of the heat exchanger for the first level of fouling and a second reference profile $\Delta NGV_{Level_{high}}$ during said transient operation phase of the heat exchanger for the first level of fouling, the other reference profiles $\Delta NGV_i$, during said transient operation phase of the heat exchanger being calculated from the first and second profiles $\Delta NGV_{Level_{low}}$ and $\Delta NGV_{Level_{low}}$.

8. The method according to claim 7, wherein the other reference profiles $\Delta NGV_i$ are calculated from the first and second reference profiles $\Delta NGV_{Rate_{low}}=\Delta NGV_{Level_{low}}$ and $\Delta NGV_{Rate_{high}}=\Delta NGV_{Level_{high}}$ by using the formula $$\Delta NGV_i = \frac{(Rate_{high} - Rate_i) \cdot \Delta NGV_{rate_{low}} + (Rate_i - Rate_{low}) \cdot \Delta NGV_{Rate_{high}}}{(Rate_{high} - Rate_{low})},$$

$Rate_{high}$, $Rate_i$ and $Rate_{low}$ being the levels of fouling respectively associated with $\Delta NGV_{Level_{high}}$, $\Delta NGV_i$, and $\Delta NGV_{Level_{low}}$.

9. The method according to claim 8, wherein, for each level of fouling considered, the step (a0) comprises performing the steps (a) and (b) for said reference heat exchanger similar to said heat exchanger during at least three occurrences of said transient operation phase associated with said level of fouling so as to obtain at least three real profiles $\Delta NGV_r$ during said transient operation phase of the heat exchanger for said level of fouling, the obtaining of the reference profile $\Delta NGV_i$, during said transient operation phase of the heat exchanger for said level of fouling comprising calculating an average of the real profiles $\Delta NGV_r$ then approximation of said average by a given function.

10. The method according to claim 9, wherein the average of the real profiles $\Delta NGV_r$ is approximated by a three-degree polynomial.

11. A non-transitory computer program product on which instruction program code are stored, the instruction program code, when executed by one or more computing device perform a method, the method comprising:

(a) during a transient operation phase of the heat exchanger, determining a value over time of Wide Range Level, NGL, from the measurements of the first and third pressure sensors, and of a value over time of Narrow Range Level, NGE, from the measurements of the second and third pressure sensors;

(b) determining a value over time of Steam Range Level deviation, ΔNGV, the Steam Range Level deviation corresponding to the Wide Range Level from which a component representative of a variation in free water surface in the heat exchanger has been filtered, from the values of NGL and NGE;

(c) comparing the value of ΔNGV determined with a set of reference profiles $\Delta NGV_i$ for said transient operation phase of the heat exchanger, each reference profile $\Delta NGV_i$ being associated with a level of fouling, so as to identify a target reference profile $\Delta NGV_{opt}$ among the reference profiles $\Delta NGV_i$, for said transient operation phase of the heat exchanger, which is that closest to the determined value ΔNGV; and (d) outputting on an interface the level of fouling associated with the identified target reference profile $\Delta NGV_{opt}$.

12. A system for evaluating fouling of passages of a spacer plate of a tubular heat exchanger, the system comprising:

a data processing unit in communication with a first pressure sensor, a second pressure sensor, and a pressure sensor, the data processing unit configured to:

(a) during a transient operation phase of the heat exchanger, determine a value over time of Wide Range Level, NGL, from the measurements of the first and third pressure sensors, and of a value over time of Narrow Range Level, NGE, from the measurements of the second and third pressure sensors;

(b) determine a value over time of Steam Range Level deviation, ΔNGV, the Steam Range Level deviation corresponding to the Wide Range Level from which a component representative of a variation in free water surface in the heat exchanger has been filtered, from the values of NGL and NGE;

(c) compare the value of ΔNGV determined with a set of reference profiles $\Delta NGV_i$ for said transient operation phase of the heat exchanger, each reference profile $\Delta NGV_i$ being associated with a level of fouling, so as to identify a target reference profile $\Delta NGV_{opt}$ among the reference profiles $\Delta NGV_i$, for said transient operation phase of the heat exchanger, which is that closest to the determined value ΔNGV; and (d) output on an interface of the level of fouling associated with the identified target reference profile $\Delta NGV_{opt}$.

13. The system according to claim 12, wherein
the first pressure sensor is arranged at a low altitude of the heat exchanger;
the second pressure sensor is arranged at a medium altitude of the heat exchanger; and
the third pressure sensor is arranged at a high altitude of the heat exchanger.

* * * * *